INVENTORS
ALFRED F. MILLINGTON
HOWARD B. DICKIE
BY
Whittemore, Hulbert & Belknap
ATTORNEYS

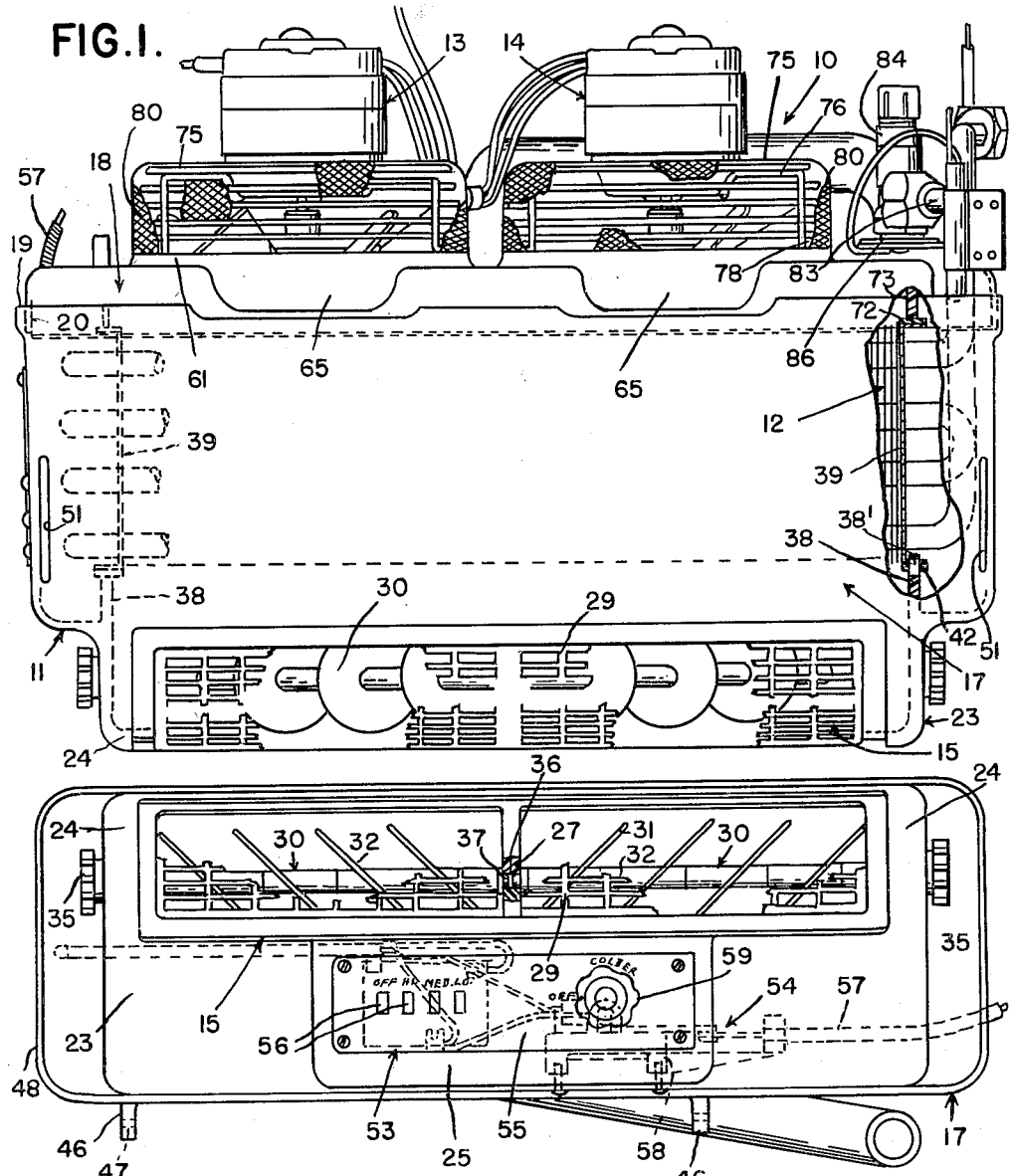

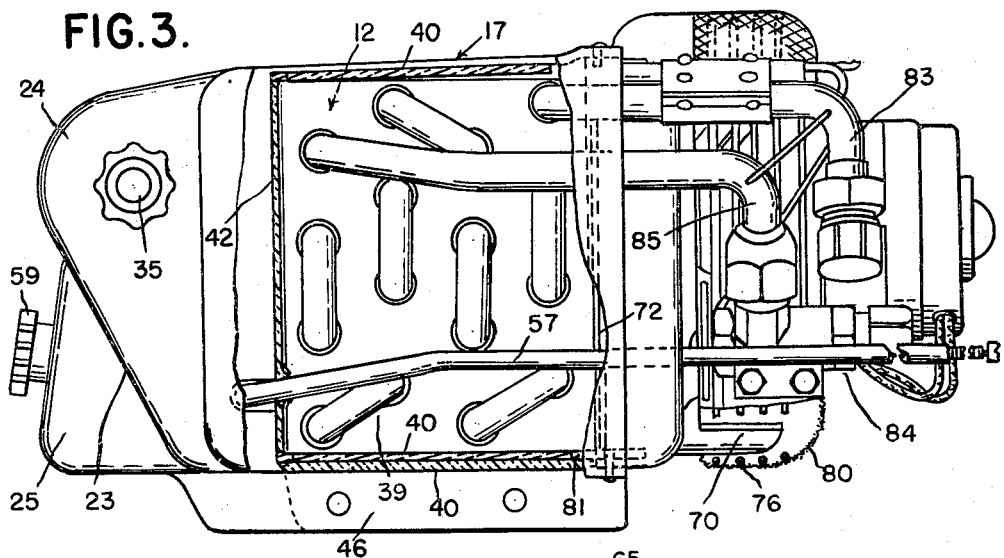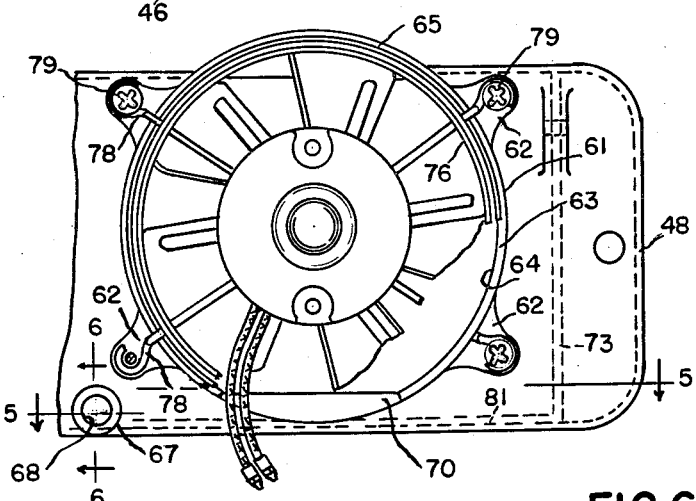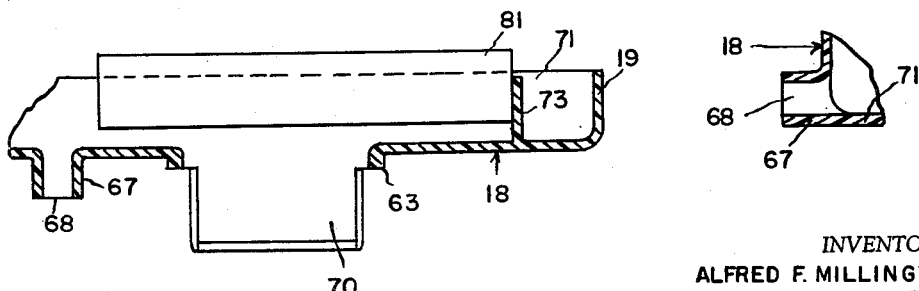

United States Patent Office 3,007,323
Patented Nov. 7, 1961

3,007,323
EVAPORATOR STRUCTURE
Alfred F. Millington, Northville, and Howard B. Dickie, Plymouth, Mich., assignors to Novi Equipment Company, Novi, Mich., a corporation of Michigan
Filed June 30, 1958, Ser. No. 745,740
12 Claims. (Cl. 62—448)

The present invention relates to an improved housing or casing structure for the evaporator unit of an automotive air conditioning system, and in particular for an evaporator of the type which is installed beneath the dashboard at the forward end of the passenger compartment of the vehicle.

It is an object of the invention to provide a simplified and very compact evaporator housing structure of this sort which is well suited for mounting in the limited space available, as by either an appropriate bracket type floor mount or a suspending hanger type of support.

In accordance with the invention the housing structure comprises two unitary molded parts engaged in interfitted relation to one another, which parts are devised to provide a collecting reservoir or sump of shallow depth but substantial size to receive evaporator coil condensate drainage; and improved baffle means are provided to prevent splashing of the condensate from the housing structure, as when the automobile is stopped suddenly.

Another object is to provide a housing or casing structure as described, of which the major component parts are fabricated of a non-rusting, synthetic plastic material to provide a forward body member having an air discharge and control panel portion or section as well as a coil receiving section within the same, the other part being a rear cover portion mounting the fan means of the evaporator. The parts coact in a novel manner in providing a condensate sump of the sort referred to, as well as means to drain condensate therefrom. The need for separate sump and drainage means is avoided.

In further accordance with this object the invention provides an improved stiffening web and deflector mounting arrangement in the air discharge section.

Yet another object is to provide a housing structure including the coacting body and rear cover components mentioned in the preceding paragraph, wherein these components each have integral rib formations to engage opposed front and rear end zones of the finned evaporator core, as at the sheet metal end plates of the core. The arrangement of the ribs relative to the end plates is such as to cause fan-impelled air to travel in a controlled way through the core and out into the interior of the vehicle to be air conditioned.

Yet another object is to provide evaporator structure as described, including provisions to mount dual fans in a compact way at fan openings in the rear cover member of the housing. Further in accordance with the invention, these fans are motor driven in the same direction, thereby causing condensate collecting in the sump of the housing to be blown transversely, in the direction of air flow, to one end of the housing. In this sort of arrangement the housing provides baffle means on at least one end of and at the bottom of the sump to control and direct the drainage of condensate to an outlet between the sump ends.

More specifically, it is an object to provide improved, baffled sump provisions of this sort, which further include individual upwardly cupped water baffles at the fan openings of the rear housing cover. These act to confine and prevent condensate from splashing out in the fan zones when the automobile is decelerated rapidly.

In general, it is an object to provide a very compact, inexpensive and reliable housing structure which affords all the necessary means to control and direct the fan air stream, to mount the evaporator's coil and core unit, to collect and dispose of condensate, etc. without need for special louvering at the fans, for separate condensate tray and drain provisions, and without resort to any means apt to rust, rattle, come loose or otherwise operate improperly.

The foregoing as well as other objects will become more apparent as this description proceeds, especially when considered in connection with the accompanying drawings illustrating a preferred embodiment of the invention, wherein:

FIG. 1 is a top plan view, partially broken away and in horizontal section, illustrating an evaporator unit embodying the improved housing structure of the invention;

FIG. 2 is a view in front elevation of the evaporator, as from the vehicle interior to be air conditioned, the view being also partially broken away and in vertical section to show a deflector mounting detail;

FIG. 3 is an end elevation, partially broken away and in front-to-rear vertical section, of the evaporator, showing the relationship of the housing components to the evaporator coil and core unit;

FIG. 4 is a fragmentary rear elevational view of the evaporator, showing the mount to its housing of one of two like blower fan and motor units, and also indicating the nature of certain sump baffle and drain provisions;

Figure 7:
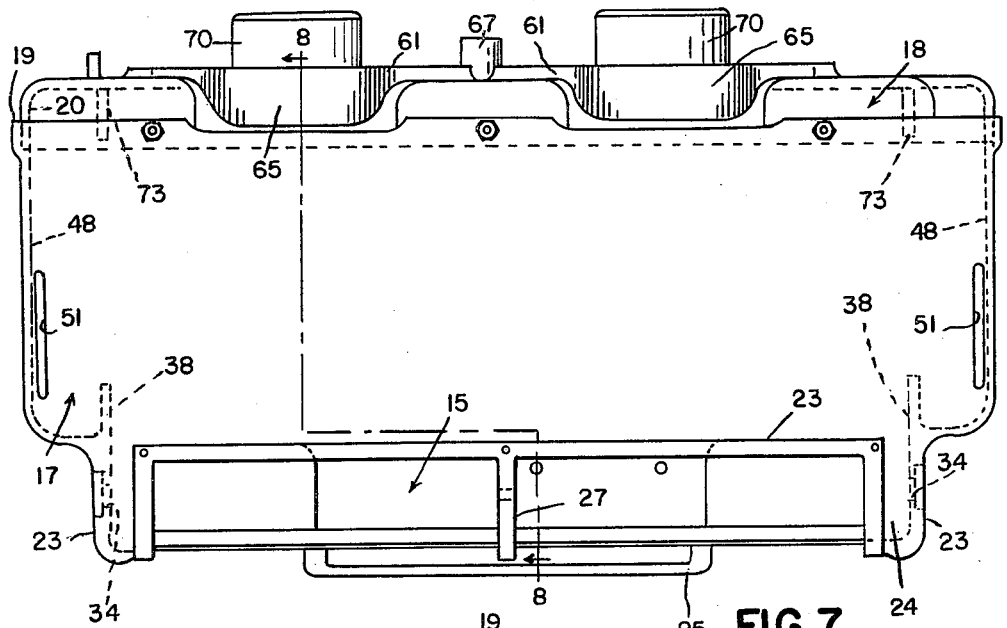
Figure 8:
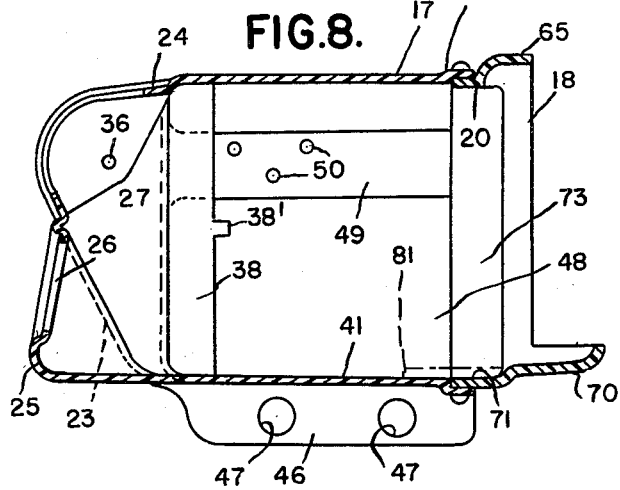

FIGS. 5 and 6 are, respectively, fragmentary views in horizontal and vertical section, along lines 5—5 and 6—6 of FIG. 4;

FIG. 7 is a plan view of the housing structure, per se, being partially broken away and in horizontal section; and FIG. 8 is a view in vertical section along broken line 8—8 of FIG. 7.

Referring first to FIGS. 1 through 4, an evaporator 10 is shown which embodies the improved housing structure 11 of the invention. This structure internally mounts a finned core and coil unit 12, and has a pair of like, motor driven fan units 13, 14 mounted on its rear, by which air is impelled through the interior of the housing and the core 12, exiting through a forwardly located deflector louver and grille section, generally designated 15, which faces the interior of the vehicle to be air conditioned. Provisions of a sort to be described support the housing and associated parts in available space beneath the dashboard, either by a floor board mount or by suspending means.

Housing structure 11 comprises but two parts, which are inexpensvely molded of a synthetic plastic compound, such as acrylonitrile, which is adequately rigid for the purpose, yet has a desired degree of flexibility to facilitate the assembly of parts that are not necessarily precision molded. As molded, the component housing parts are so formed as to provide in combination all the necessary condensate collecting and drainage means for the evaporator 10, without requiring separate provisions for this purpose. The housing 11 comprises a one-piece main or body portion 17 of generally rectangular, box-like outline, and a mating rear cover portion 18 of specially shaped contour, upon which the fans 13, 14 are carried.

The rear portion 18, as best revealed in FIG. 8, is adapted to be nested within the adjacent periphery of the main body portion 17, and to this end, the portion 17 has an outwardly flared flange 19 about this periphery, in which an adjacent peripheral mating flange 20 of the rear portion 18 fits snugly, being held in place by a series of screws 21 about the flange zone.

The opposite or forward side of the molded housing body portion 17 is contoured in molding to provide, inwardly of the opposite end walls of the housing, a forwardly projecting, upwardly angled louver and control panel section 23 of generally triangular cross section outline, but rounded at its forward top portion 24, as shown in FIG. 3. Centrally of and beneath the rounded portion the section 23 is further formed in molding to provide a more or less upright control panel portion 25 having a horizontally elongated rectangular aperture 26 therein. The housing portion 25 is for the reception of electrical and mechanical control units, to be described.

The rounded louver section 24, above the control panel portion 25, is provided with elongated air discharge apertures at either side of an integral central web 27, which depends inwardly and is of substantial thickness, being located midway between the ends of section 24, as shown in FIG. 8. In addition to rigidifying the forward housing part 17 as a whole, the web 27 has a further function to be described. A suitably ornamental metal grille 29 of rounded sectional contour, matching that of the louver section 24 and the upper surface of stiffening web 27, is applied over the thus defined openings; and it will be understood that air driven by fans 13, 14 through the housing interior and past the coils of the unit 12 discharges forwardly and upwardly through the grille 29.

In order to provide for control of the direction of this discharging air, it is contemplated that an adjustable louver-type deflector be mounted behind the grille 29, this deflector being preferably as illustrated and described in our copending application, Serial No. 745,757, filed June 30, 1958, now abandoned. Although constituting no part of the present invention, the louver structure may comprise a pair of like louver units 30, each comprising a series of inclined disks 31 fixedly mounted by an integral hub 32 upon a shaft or spindle. In order to receive and rotatably journal this shaft, the ends of the protuberant rounded portion 23 of air discharge section 23 are provided with aligned openings 34 (FIG. 7) each rotatably receiving an adjacent end of one of the respective shafts, and an external finger piece or knob 35 is applied to this shaft end, outwardly of the end of the protuberant portion 24.

The central stiffening web 27 of the housing section 23 functions also in rotatably supporting the louver units 30, being provided with an aperture 36 aligned with the openings 34, in which adjacent trunnion ends 37 of the shafts of the respective deflector units 30 are rotatably received as shown in FIG. 2.

Thus it is seen that the housing structure is stiffened and rigidified by the forward web 27 in the discharge zone thereof, this web serving the further function of journalling the adjustable louvers. Manual actuation of either of the knobs 35 adjusts the angularity of the disks 31 to direct the flow of air in the lateral and vertical senses, as desired, all as described in our copending application Serial No. 745,757, identified above.

Further referring to FIGS. 7 and 8, in conjunction with FIGS. 1 and 3, the main housing portion 17 is provided, just to the rear of the ends of forward protuberant portion 23, with a pair of integral internal ribs 38 extending to the rear thereof in parallel planes which are spaced inwardly from the extreme opposite ends of the housing. Ribs 38 are engaged from the rear by the respective upright sheet metal end plates 39 of the evaporator coil and core unit 12, as shown in FIG. 1; and one or both of the ribs 38 is provided with an integral rear lug extension 38' for mating engagement with an end plate of the core unit 12 in positioning the latter within the housing. With the core unit 12 assembled thereto, the ribs 38 coact with the respective core end plates 39 in directing the flow of air from fans 13, 14 forwardly through core unit 12 and out the discharge grille section 15.

In thus assembling the unit 12, a heat insulating gasket, pad or mat 40, coextensive in horizontal area with the unit, is placed on the floor 41 of housing body portion 17, as shown in FIG. 3, on which mat the core unit 12 is rested; and a similar mat 40 is applied over the top of the unit. Strips 42 of rubber gasket or sealing material are also adhesively secured to the vertical flange zones of its end plates 39 (as shown in FIGS. 1 and 3), being compressed forwardly against the integral housing ribs 38 to seal the core structure in these zones.

As indicated above, the main housing portion 17 is provided with means for the optional mounting of the evaporator 10 beneath the dashboard. Such means may comprise a pair of spaced mounting ribs 46 of thick section formed integrally with the floor 41 to extend across the front-to-rear width of the latter, as illustrated in FIGS. 3 and 8. Such ribs may be apertured at 47 to receive suitable bracket means (not shown) to secure the housing to a floor support.

As an alternative type of mount, the end walls of the main housing portion 17, as designated 48, may be formed with integral thickened pad formations 49 on their inner surfaces, the walls being provided with apertures 50 in this zone. These are for the reception of screw or like means to suspend the housing from a hanger type of mount (not shown) beneath the dashboard; and to this end the top panel or housing member 17 is formed, immediately above the screw apertures 50, with a pair of opposed elongated slots 51, through which strap-like hangers may be introduced. As so positioned for support, screws are applied to the apertures 50, engaging in the hangers to suspend and hold the evaporator rigidly.

Although not constituting part of the present invention (being the subject matter of our further copending application, Serial No. 748,436, filed July 14, 1958), an electrical control switch unit 53 and a mechanical control unit 54 are disposed within the forward housing formation 25, with a face plate or panel 55 for these units covering the forward housing opening 26. The electrical control unit 53 is a type including a plurality of push buttons 56 to regulate the starting, stopping and speeds of fan operation, and the mechanical unit 54 is a rack and pinion type operating a flexible cable 57, this unit including a casting 58 which may be secured by screws to the bottom of the formation or extension (25), and being provided with a finger control knob 59 forwardly of panel 55.

The second or rear cover portion 18 of the housing structure is best shown in FIGS. 5 through 8 of the drawings, considered in conjunction with FIGS. 3 and 4. It is molded of the same material as body member 18 to provide rear bosses 61, each including four ear extensions 62 (FIG. 4). The bosses each include a circular, rearwardly projecting rib 63 surrounding a fan opening at 64, with an arcuate, hump-like portion or continuation 65 of this rib completing the contour of the opening 64 above the level of the remainder of the housing portion 18 and the main housing portion 17. Between the two bosses 61, and adjacent the bottom of cover portion 18, the latter is provided with a further integral and rearwardly projecting circular boss 67, in which a drain opening 68 is molded.

Referring to FIGS. 7 and 8 of the drawings, it will be noted that an outwardly extending and upwardly facing concave or cup-like baffle lip 70 is formed on each of the bosses 61 directly beneath the respective fan openings 64. It will also be noted from FIG. 8 that these baffles 70 are at an elevation a trifle above the level at which the inner surface of the nesting flange 20 of housing portion 18 comes flush with the floor 41 of housing portion 17. Thus, in the zone between the baffles 70 and the housing floor 41, there is a depressed sump portion in which condensate from the coil and core unit 12 may collect, for subsequent drainage through the central drain opening 68.

As operatively mounted between the housing members 17, 18, the coil core 12, as shown in FIG. 1, has rubber gasket strips 72 adhered along the rear flanges of its end plates 39, and the rear housing member 18 is provided with a pair of integrally molded, vertical and forwardly projecting ribs 73 for compressive engagement with these strips along the inner rib edges. Thus the ribs 73 of the rear housing member coact with the core end plates 39, and the corresponding ribs 38 of the main housing member 17 in defining the path of cold air flow through the core unit and out the forward discharge grille portion 15 of the housing.

Referring to FIG. 4, the fans 13, 14 include rigid wire mounting frames 74 centrally secured coaxially on the respective motors 13, 14, and four radially extending wire components 76 of these frames terminate in outturned eyes 78. The spacing of these eyes is the same as that of the ear extensions 62 of the bosses 61 of rear housing member 18, and suitable screws 79 are employed to secure the eyes 78 of the frames 74 to the boss extensions 62. Suitable filter sheaths 80 are applied over the exterior of the respective fan and motor mounting frames 74.

In accordance with the invention, the fans 13, 14 are driven to rotate in the same direction, thus to cause condensate collected in the sump which is constituted by the floor 41 of the housing portion 17 and the cover sump part 71 to be blown and move toward one end of the housing. In order to control and direct such condensate ultimately to the drain opening 68, a rubber baffle strip 81, FIGS. 3 and 5 (also indicated in dot-dash line in FIGS. 4 and 8) is adhesively secured along the joint of the housing portions 17, 18. In the alternative a formation similar to the baffle strip 81 may be integrally molded on cover member 18. This insures that the condensate, as blown to the end at which the formation or strip is located, will ultimately be drained out the drain opening 68 in the rear center zone of the housing.

Features of the evaporator coil and core unit 12, including (as shown in FIGS. 1 and 3) the refrigerant return or suction line 83 to the compressor, the line 84 from the condenser receiver, the outlet to 85, expansion valve 86, etc., are conventional and form no part of the invention. Following installation of the core in the housing of the invention, these exposed parts are wrapped with suitable thermal insulating material to prevent sweating.

What we claim as our invention is:

1. An evaporator housing structure comprising a housing body member of integral construction provided with a forward air discharge aperture and having an interior space of substantial volume and substantially rectangular cross sectional outline to the rear of said aperture, which space is exposed at the rear of said member for the reception centrally thereof of a heat transfer core unit of generally similar cross sectional outline, and a one-piece rear cover member fitted to said first member across the rear of the latter, said body and cover members having integral rib projections respectively facing and engageable at respective rearwardly and forwardly facing edges thereof with front and rear sides of said core unit adjacent opposite respective ends thereof, thus to position the core unit and in part define a path of air circulation through the latter, said cover member being provided with at least one fan opening between its rib formations.

2. An evaporator housing structure comprising a housing body member of integral construction provided with a forward air discharge aperture and having an interior space of substantial volume and substantially rectangular cross sectional outline to the rear of said aperture, which space is exposed at the rear of said member for the reception centrally thereof of a heat transfer core unit of generally similar cross sectional outline, a one-piece rear cover member fitted to said first member across the rear of the latter, said body and cover members having integral rib projections respectively facing and engageable at respective rearwardly and forwardly facing edges thereof with front and rear sides of said core unit adjacent opposite respective ends thereof, thus to position the core unit and in part define a path of air circulation through the latter, said cover member being provided with at least one fan opening between its rib formations and said body and cover members having bottom portions meeting at a level beneath said fan opening to provide a condensate collecting sump beneath said core unit.

3. An evaporator housing structure comprising a housing body member of integral construction provided with a forward air discharge aperture and having an interior space of substantial volume and substantially rectangular cross sectional outline to the rear of said aperture, which space is exposed at the rear of said member for the reception of a heat transfer core unit of generally similar cross sectional outline, a one-piece rear cover member fitted to said first member across the rear of the latter, said body and cover members having integral rib projections respectively facing and engageable with front and rear sides of said core unit adjacent opposite respective ends thereof, thus to position the core unit and in part define a path of air circulation through the latter, said cover member being provided with at least one fan opening between its rib formations and said body and cover members having bottom portions meeting at a level beneath said fan opening to provide a condensate collecting sump beneath said core unit, and means on said cover member to mount a fan externally on said cover member and coaxially of said fan opening, said cover member having an integral, rearwardly directed and upturned baffle extension located at said fan opening and above said sump to rearwardly confine and prevent outward splash of said condensate from said sump.

4. An evaporator housing structure comprising a housing body member of integral one-piece construction provided with a forward air discharge aperture of elongated outline along a forward panel portion thereof, and a one-piece housing rear cover member fitted to said first member to cover the rear of the latter, said housing member having an integral inwardly facing stiffening web between the ends of said aperture, a louver member rotatably mounted to the rear of said aperture by means integral with said housing member and including said web, said housing member having an interior space of substantial volume to the rear of said forward discharge aperture for the reception of a heat transfer core unit, said body and cover members having integral rib projections respectively facing and engageable at respective rearwardly and forwardly facing edges thereof with front and rear sides of said core unit adjacent the respective ends of the latter thereof to in part define a path of air circulation through said core unit.

5. An evaporator housing structure comprising a housing body member of integral one-piece construction provided with a forward air discharge aperture of elongated outline along a forward panel portion thereof, and a one-piece housing rear cover member fitted to said first member to cover the rear of the latter, said housing member having an integral inwardly facing stiffening web between the ends of said aperture, a louver member rotatably mounted to the rear of said aperture by means integral with said housing member and including said web, said housing member having an interior space of substantial volume to the rear of said forward discharge aperture for the reception of a heat transfer unit, said body and cover members having integral rib projections respectively facing and engageable with front and rear sides of said core adjacent the respective ends of the latter thereof to in part define a path of air circulation through said core, said cover member having at least one fan opening and being provided with means to mount a fan coaxially of said fan opening.

6. An evaporator housing structure comprising a housing body member of integral one-piece construction provided with a forward air discharge aperture of elongated outline along a forward panel portion thereof, and a one-piece housing rear cover member fitted to said first member to cover the rear of the latter, said housing member having an integral inwardly facing stiffening web between the ends of said aperture, a louver member rotatably mounted to the rear of said aperture by means integral with said housing member and including said web, said housing member having an interior space of substantial volume to the rear of said forward discharge aperture for the reception of a heat transfer unit, said body and cover members having integral rib projections respectively facing and engageable with front and rear sides of said core adjacent the respective ends of the latter thereof to in part define a path of air circulation through said core, said cover member having at least one fan opening between said rib formations and being provided with means to mount a fan externally and coaxially of said fan opening.

7. An evaporator housing structure comprising a housing body member of integral construction and elongated rectangular outline provided with a forward air discharge aperture and having an interior space to the rear of said aperture exposed at the rear of said member for the reception of a heat transfer unit of similar elongated rectangular outline, and a rear cover member fitted to said first member across the rear of the latter, at least one of said body and cover members having integral rib projections facing and engageable at inner edges thereof with a side of said heat transfer unit adjacent opposite ends of the latter, thus to position the heat transfer unit and in part define a path of air circulation through the latter.

8. An evaporator housing structure comprising a housing body member of integral construction and elongated rectangular outline provided with a forward air discharge aperture and having an interior space to the rear of said aperture exposed at the rear of said member for the reception of a heat transfer unit of similar elongated rectangular outline, and a rear cover member fitted to said first member across the rear of the latter, said cover member having integral rib projections facing and engageable at inner edges thereof with the rear side of said core adjacent opposite ends thereof, thus to position the heat transfer unit and in part define a path of air circulation through the latter.

9. An evaporator housing structure comprising a housing body member of integral construction and elongated rectangular outline provided with a forward air discharge aperture and having an interior space to the rear of said aperture exposed at the rear of said member for the reception of a heat transfer unit of similar elongated rectangular outline, and a rear cover member fitted to said first member across the rear of the latter, said body and cover members each having integral rib projections facing and engageable at inner edges thereof with front and rear sides of said heat transfer unit adjacent opposite respective ends thereof, thus to position the heat transfer unit and in part define a path of air circulation through the latter.

10. An evaporator housing structure comprising a housing body member of integral construction provided with a forward air discharge aperture and having an interior space of substantial volume and substantially rectangular cross sectional outline to the rear of said aperture, which space is exposed at the rear of said member for the reception of a heat transfer core unit, and a one-piece rear cover member fitted to said first member across the rear of the latter, said cover member being provided with at least one fan opening and said body and cover members having bottom portions meeting at a common level through and in the plane of said fan opening and shaped to provide by themselves a condensate collecting sump beneath said core unit, said cover member being provided with forwardly facing rib formations positioned outwardly of said fan opening for engagement with the core unit at longitudinally spaced points along the latter.

11. An evaporator housing structure comprising a housing body member of integral construction provided with a forward air discharge aperture and having an interior space of substantial volume and substantially rectangular cross sectional outline to the rear of said aperture, which space is exposed at the rear of said member for the reception of a heat transfer core unit, a one-piece rear cover member fitted to said first member across the rear of the latter, said cover member being provided with at least one fan opening and said body and cover members having bottom portions meeting at a common level through and in the plane of said fan opening to provide a condensate collecting sump beneath said core unit, and means on said cover member to mount a fan externally on said cover member and coaxially of said fan opening, said cover member having an integral, rearwardly directed and upturned baffle extension located at said fan opening and above said sump to rearwardly confine and prevent outward splash of said condensate from said sump, said cover member being provided with forwardly facing rib formations positioned outwardly of said fan opening for engagement with the core unit at longitudinally spaced points along the latter.

12. An evaporator housing structure comprising a housing body member of integral construction provided with a forward air discharge aperture and having an interior space of substantial volume and substantially rectangular cross sectional outline to the rear of said aperture, which space is exposed at the rear of said member for the reception of a heat transfer core unit, a one-piece rear cover member fitted to said first member across the rear of the latter, said cover member being provided with at least one fan opening and said body and cover members having bottom portions meeting at a common level through and in the plane of said fan opening to provide a condensate collecting sump beneath said core unit, means on said cover member to mount a fan externally on said cover member and coaxially of said fan opening, said cover member having an integral, rearwardly directed and upturned baffle extension located at said fan opening and above said sump to rearwardly confine and prevent outward splash of said condensate from said sump, and means on said cover member providing a condensate drain opening from said sump at one side of said fan opening, said cover member being provided with forwardly facing rib formations positioned outwardly of said fan opening for engagement with the core unit at longitudinally spaced points along the latter.

References Cited in the file of this patent

UNITED STATES PATENTS

| | | |
|---|---|---|
| 1,937,669 | Replogle | Dec. 5, 1933 |
| 2,042,420 | Askin | May 26, 1936 |
| 2,186,562 | Sperry | Jan. 9, 1940 |
| 2,285,945 | Rundell | June 4, 1942 |
| 2,335,627 | Wolfert | Nov. 30, 1943 |
| 2,751,760 | Williams | June 26, 1956 |
| 2,853,935 | Crowle | Sept. 30, 1958 |